United States Patent
Kawamata et al.

(10) Patent No.: US 9,661,834 B2
(45) Date of Patent: May 30, 2017

(54) DUAL-BEARING REEL

(71) Applicant: Shimano Inc., Sakai, Osaka (JP)

(72) Inventors: Atsushi Kawamata, Osaka (JP); Hiroki Ogose, Osaka (JP)

(73) Assignee: Shimano Inc., Osaka (JP)

( * ) Notice: Subject to any disclaimer, the term of this patent is extended or adjusted under 35 U.S.C. 154(b) by 198 days.

(21) Appl. No.: 14/609,233

(22) Filed: Jan. 29, 2015

(65) Prior Publication Data
US 2015/0272101 A1   Oct. 1, 2015

(30) Foreign Application Priority Data
Mar. 25, 2014   (JP) .................................. 2014-62651

(51) Int. Cl.
*A01K 89/01* (2006.01)
*A01K 89/015* (2006.01)
*A01K 89/017* (2006.01)

(52) U.S. Cl.
CPC .......... *A01K 89/015* (2013.01); *A01K 89/017* (2013.01); *A01K 89/01928* (2015.05); *A01K 89/01931* (2015.05)

(58) Field of Classification Search
CPC .............. A01K 89/015; A01K 89/0192; A01K 89/01931; A01K 89/01928
See application file for complete search history.

(56) References Cited

U.S. PATENT DOCUMENTS

| 3,659,808 A | * | 5/1972 | Fleischer | A01K 89/015 188/82.1 |
| 4,651,949 A | * | 3/1987 | Sato | A01K 89/033 192/14 |
| 4,681,276 A | * | 7/1987 | Sato | A01K 89/015 242/249 |
| 4,805,849 A | * | 2/1989 | Nanbu | A01K 89/015 242/271 |
| 5,386,948 A | * | 2/1995 | Sato | A01K 89/015 242/313 |
| 5,810,274 A | * | 9/1998 | Cockerham | A01K 89/015 242/314 |

(Continued)

FOREIGN PATENT DOCUMENTS

JP   4500599 B2   4/2010

*Primary Examiner* — Emmanuel M Marcelo
(74) *Attorney, Agent, or Firm* — Global IP Counselors, LLP (57) ABSTRACT

A dual-bearing reel includes a reel body and a spool. The reel body includes a spool housing portion having an inward opening. The spool includes a first flange that has a larger diameter than a bobbin trunk. The outer peripheral part of the first flange includes a first and second outer peripheral parts, and a connecting portion. The first outer peripheral part is disposed at a first prescribed distance away from an inner peripheral part of the first spool housing portion. The second outer peripheral part is disposed at a second prescribed distance away from the inner peripheral part and has a smaller diameter than the first outer peripheral part. The diameter of the connecting portion gradually increases from the second outer peripheral part toward the first outer peripheral part and couples the first outer peripheral part and the second outer peripheral part.

10 Claims, 5 Drawing Sheets

(56) References Cited

U.S. PATENT DOCUMENTS

| | | | | |
|---|---|---|---|---|
| 5,855,332 | A * | 1/1999 | Stiner | A01K 89/015 242/322 |
| 6,412,720 | B1 * | 7/2002 | Ikuta | A01K 89/015 242/269 |
| 2005/0211812 | A1 * | 9/2005 | Nakagawa | A01K 89/015 242/223 |
| 2008/0173745 | A1 * | 7/2008 | Takechi | A01K 89/015 242/321 |
| 2009/0314871 | A1 * | 12/2009 | Kobayashi | A01K 89/015 242/255 |
| 2011/0315801 | A1 * | 12/2011 | Hayashi | A01K 89/0117 242/247 |
| 2012/0018562 | A1 * | 1/2012 | Takamatsu | A01K 89/015 242/307 |
| 2013/0233957 | A1 * | 9/2013 | Niitsuma | A01K 89/02 242/285 |
| 2014/0263791 | A1 * | 9/2014 | Sabtu | A01K 89/01 242/224 |

\* cited by examiner

DUAL-BEARING REEL

CROSS-REFERENCE TO RELATED APPLICATIONS

This application claims priority to Japanese Patent Application No. 2014-62651 filed on Mar. 25, 2014, the entirety of which is hereby incorporated by reference.

BACKGROUND OF THE INVENTION

Technical Field

The present invention relates to a fishing reel and, specifically, to a dual-bearing reel that can cast a fishing line in a forward direction.

Background Information

The reel body of a dual-bearing reel comprises a circular spool housing portion that houses a flange of a spool. A gap is formed between an inner peripheral surface of the spool housing portion and an outer peripheral surface of the flange. If this gap is too large, there is the risk that, when thin fishing line is used, the fishing line will enter the inside of the reel body in the gap between the inner peripheral surface and the outer peripheral surface and will become tangled inside the reel body. If the above-described gap is reduced in order to prevent the entry of the fishing line, there is the possibility that the outer peripheral surface of the flange will come in contact with the inner peripheral surface of the spool housing portion. Therefore, in a conventionally known dual-bearing reel, a fishing line entry prevention section having an annular protruding shape is disposed on the outer peripheral surface of the flange, and a tubular section (an annular section) is disposed on the spool housing portion opposing the fishing line entry prevention section (refer to, for example, U.S. Pat. No. 4,500,599).

In a conventional dual-bearing reel, a fishing line is less likely to enter from the spool housing portion into the reel body due to a fishing line entry prevention section that protrudes in an annular shape. Additionally, even if the fishing line passes through the fishing line entry prevention section of the reel body and enters the inside area, the fishing line will be less likely to drop, that is, the fishing line will be less likely to drop to the radially inward side (spool shaft) by coming in contact with the tubular section.

The distal end of the tubular section (the annular section) also has a tapered portion whose diameter extends from the inner peripheral surface toward the distal end surface. This tapered section is formed so that the end on the inner peripheral surface side is positioned axially inward from the outermost diameter portion of the distal end of the fishing line entry prevention section.

In a conventional dual-bearing reel, a fishing line is less likely to drop even if the fishing line enters the inside of the reel body from the fishing line entry prevention section.

Additionally, since the inner peripheral side end of the tapered section is positioned axially inward from the outermost diameter portion of the distal end of the fishing line entry prevention section, the gap between the fishing line entry prevention section and the annular section can be minimized; as a result, the fishing line is less likely to enter in the gap between the fishing line entry prevention section and the annular section.

However, removing the fishing line that has entered the reel body from the fishing line entry prevention section is difficult.

The object of the present invention is to facilitate the removal of the fishing line from the inside of the reel body when the fishing line enters the inside of the reel body.

SUMMARY

The dual-bearing reel according to the present invention is able to cast a fishing line in a forward direction. The dual-bearing reel comprises a reel body and a spool. The reel body comprises a spool housing portion having an inward opening. The spool comprises a bobbin trunk configured to wind a fishing line, a first flange that is formed on one end of the bobbin trunk and that has a larger diameter than the bobbin trunk, and a second flange that is formed on the other end of the bobbin trunk and that has a larger diameter than the bobbin trunk.

The outer peripheral part of at least one of the first flange or the second flange comprises a first outer peripheral part, a second outer peripheral part, and a first connecting portion. The first outer peripheral part is disposed at a first prescribed distance away from the inner peripheral part of the spool housing portion. The second outer peripheral part is disposed at a second prescribed distance away from the inner peripheral part of the spool housing portion and is smaller in diameter than the first outer peripheral part. The diameter of the first connecting portion gradually increases from the second outer peripheral part toward the first outer peripheral part and couples the first outer peripheral part and the second outer peripheral part.

In this dual-bearing reel, the diameter of the first connecting portion gradually increases from the second outer peripheral part toward the first outer peripheral part. Here, even if the fishing line enters the second outer peripheral part from the gap between the first outer peripheral part and the spool housing portion, if the fishing line is pulled, a force acts to return the fishing line to the bobbin trunk, and the fishing line can more easily be returned to the bobbin trunk along the first connecting portion. For this reason, removing the fishing line from the inside of the reel body when the fishing line enters the inside of the reel body is easy.

The inner peripheral part of the spool housing portion can comprise a first inner peripheral part disposed at a first prescribed distance away from the first outer peripheral part and a second inner peripheral part disposed at a second prescribed distance away from the second outer peripheral part and is smaller in diameter than the first inner peripheral part. Accordingly, since a second inner peripheral part that is smaller in diameter than the first inner peripheral part of the spool housing portion is disposed at a second prescribed distance away from the second outer peripheral part, the fishing line is less likely to enter the inside of the reel body from the gap between the second outer peripheral part and the second inner peripheral part.

The spool housing portion can comprise a second connecting portion that couples the first inner peripheral part and the second inner peripheral part. Accordingly, since the first inner peripheral part and the second inner peripheral part are coupled, even if the fishing line enters the second outer peripheral part, this fishing line comes in contact with the second connecting portion and is less likely to enter the inside of the reel body.

The second connecting portion can be continuously curved to couple the first inner peripheral part and the second inner peripheral part. Accordingly, making the shape facilitate the return of the fishing line to the second outer peripheral part is even if the fishing line comes in contact with the second connecting portion. Additionally, since the second connecting portion is smoothly formed, the fishing line is less likely to be damaged even if the fishing line comes in contact with the second connecting portion.

The first prescribed distance and the second prescribed distance can be the same distance. In this case, the first outer peripheral part and the second outer peripheral part are less likely to come in contact with the spool housing portion.

The second prescribed distance can be less than the first prescribed distance. Accordingly, the fishing line is less likely to enter the inside of the reel body from the second outer peripheral part.

The first connecting portion is continuously curved to couple the first outer peripheral part and the second outer peripheral part. Accordingly, since the first connecting portion is smoothly formed, the fishing line is less likely to be damaged even if the fishing line comes in contact with the first connecting portion.

The first flange can be disposed on the side of a handle for rotating the spool, and can comprise an outer peripheral part. Accordingly, removing the fishing line from the inside of the reel body is easy even when the fishing line enters the inside of the reel body from the handle side.

The second flange can comprise an outer peripheral part. Accordingly, removing the fishing line is easy even if the fishing line enters the inside of the reel body from the second flange.

The first prescribed distance and the second prescribed distance may be in the range of 0.5 mm to 2 mm. Accordingly thin fishing line is less likely to enter from the first outer peripheral part and the second outer peripheral part, and the first outer peripheral part and the second outer peripheral part are less likely to come in contact with the spool housing portion.

According to the present invention, even if the fishing line enters the second outer peripheral part from the gap between the first outer peripheral part and the spool housing portion, if the fishing line is pulled, a force acts to return the fishing line to the bobbin trunk, and the fishing line can more easily return to the bobbin trunk along the first connecting portion. For this reason, removing the fishing line from the inside of the reel body is easy even when the fishing line enters the inside of the reel body.

BRIEF DESCRIPTION OF THE DRAWINGS

Referring now to the attached drawings which form a part of this original disclosure.

DETAILED DESCRIPTION OF THE EMBODIMENTS

Figure 1:
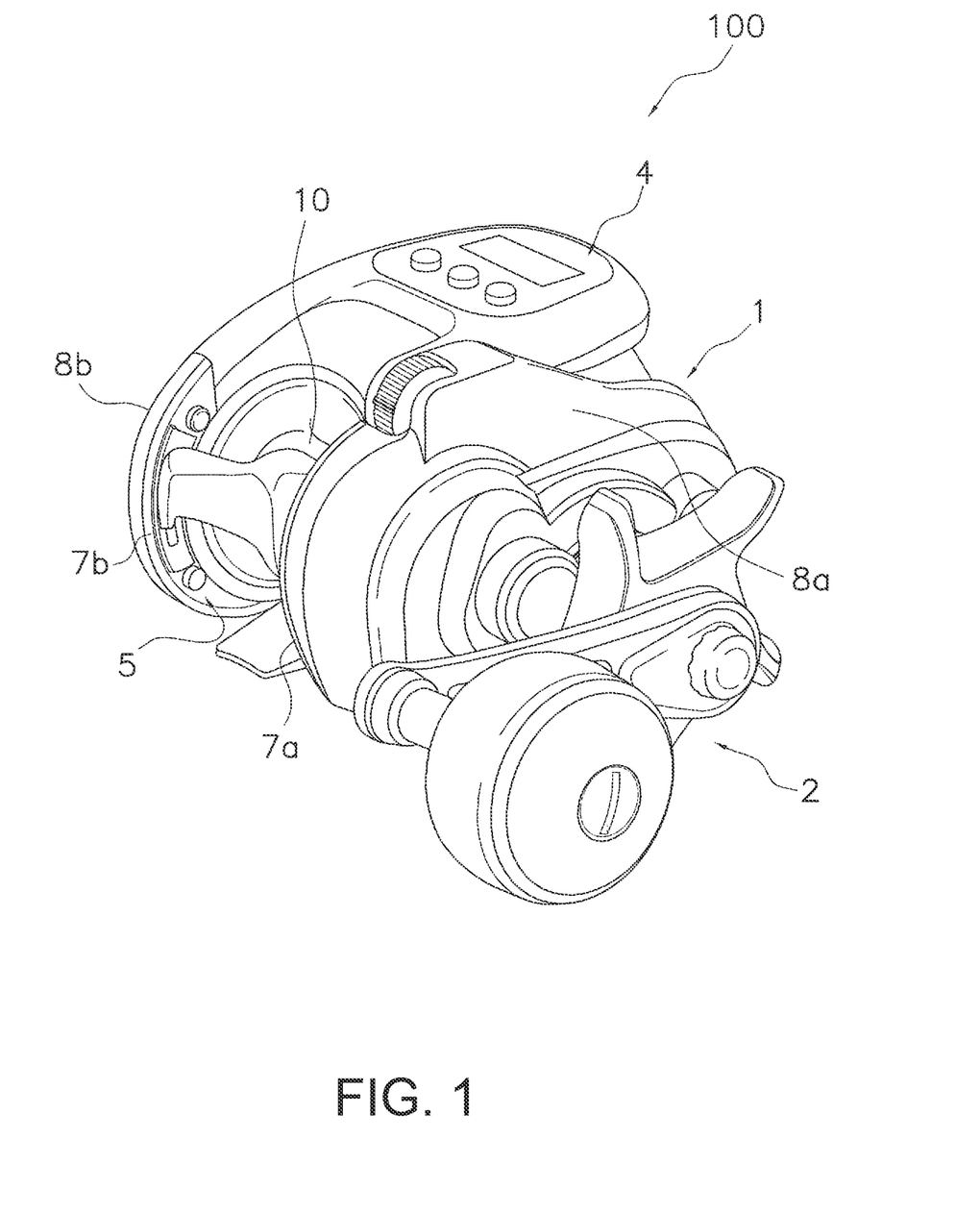
FIG. 1 is a cross-sectional view of a dual-bearing reel according to a first embodiment of the present invention.
Figure 2:
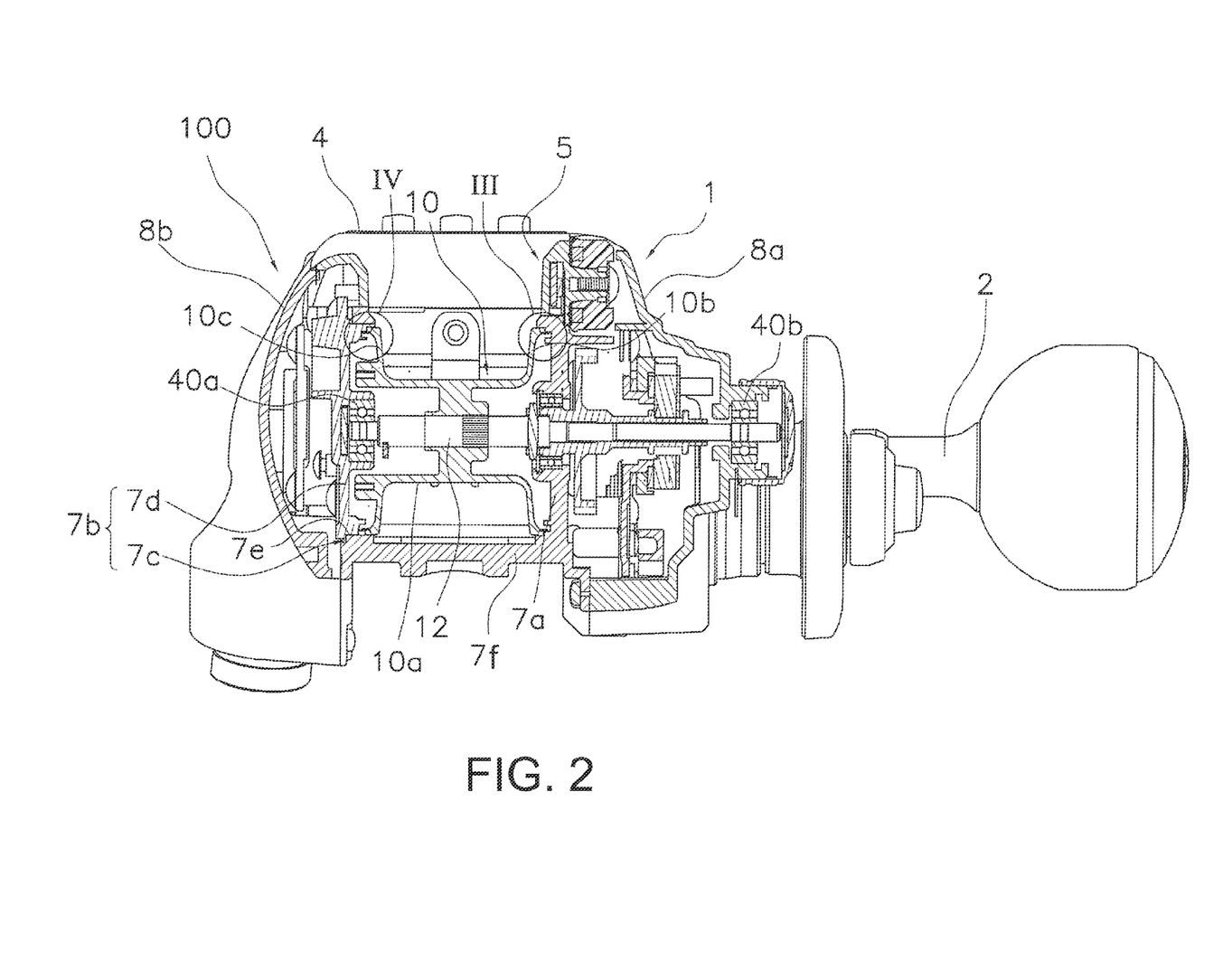
FIG. 2 is a cross-sectional rear view thereof.

FIG. 1 and FIG. 2, a dual-bearing reel 100 according to one embodiment of the present invention is an electric reel configured to rotationally drive a spool 10 with a motor (not shown), and is configured to cast a fishing line in a forward direction. The dual-bearing reel 100 comprises a reel body 1, a handle 2 rotatably mounted on one side of the reel body 1, and a spool 10 rotatably supported by the reel body 1. The dual-bearing reel 100 also comprises a counter 4 for displaying the water depth.

As shown in FIG. 2, the reel body 1 comprises a frame 5, a first side cover 8a and a second side cover 8b for covering both sides of the frame 5. The frame 5 comprises a first side plate 7a on the handle 2 side and a second side plate 7b disposed opposing the first side plate 7a. The first side plate 7a comprises a first spool housing portion 14a configured to house a first flange 10b of the spool 10 mentioned below.

The second side plate 7b comprises a side plate body 7c having a circular opening 7e through which the spool 10 can pass, as well as a disc-shaped spool support portion 7d detachably mounted to the opening 7e of the side plate body 7c by a screw member. The side plate body 7c is integrally formed with the first side plate 7a via a plurality of connecting members 7f. The spool support portion 7d rotatably supports one end of a spool shaft 12, to which the spool 10 is integrally and rotatably mounted, via an axle bearing 40a. The other end of the spool shaft 12 is rotatably supported by the first side cover 8a via an axle bearing 40b.

The spool support portion 7d comprises a spool housing portion 14b that houses a second flange 10c of the spool 10 mentioned below. The first spool housing portion 14a and the second spool housing portion 14b are examples of a spool housing portion, which will be described in detail along with the explanation of the spool 10.

The spool 10 comprises a bobbin trunk 10a to which the spool shaft 12 is integrally and rotatably connected, a first flange 10b that is disposed on the handle 2 side, and a second flange 10e. The first flange 10b is integrally formed on one end of the bobbin trunk 10a (the right end in FIG. 2) and has a larger diameter than the bobbin trunk 10a. The second flange 10c is integrally formed on the other end of the bobbin trunk 10a (the left end in FIG. 2) and has a larger diameter than the bobbin trunk 10a. The first flange 10b comprises an outer peripheral part 16, and the second flange 10c comprises an outer peripheral part 20.

Figure 3:
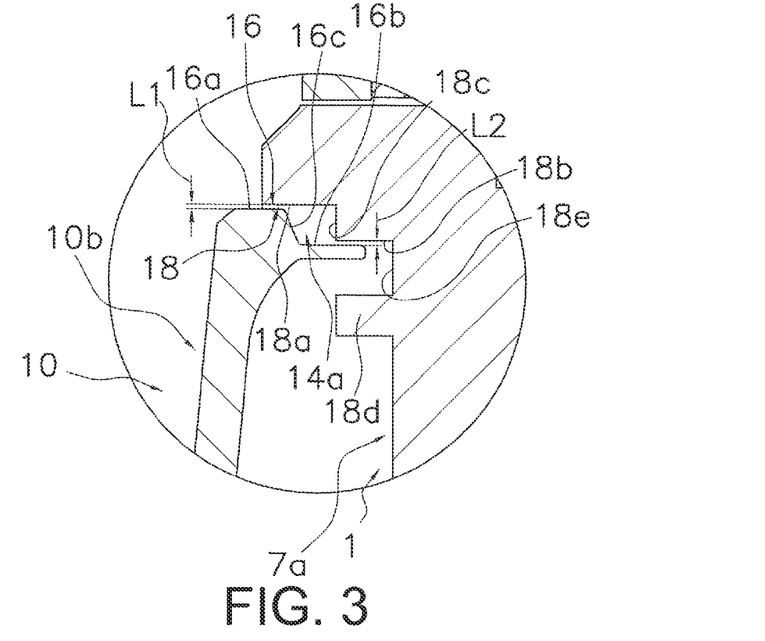
FIG. 3 is an enlarged view of the III portion in FIG. 2.

On the outer peripheral part 16, the first flange 10b comprises a first outer peripheral part 16a, a second outer peripheral part 16b, and a first connecting portion 16c, as shown in FIG. 3. The first outer peripheral part 16a is disposed at a first prescribed distance L1 away from an inner peripheral part 18 of the spool housing portion 14a mentioned below. The first outer peripheral part 16a is an outer peripheral surface that is substantially parallel with the spool shaft 12. The second outer peripheral part 16b is disposed at a second prescribed distance L2 away from the inner peripheral part 18 of the first spool housing portion 14a and is smaller in diameter than the first outer peripheral part 16a. The second outer peripheral part 16b is an outer peripheral surface that is substantially parallel with the spool shaft 12. The diameter of the first connecting portion 16c gradually increases from the second outer peripheral part 16b toward the first outer peripheral part 16a and couples the first outer peripheral part 16a and the second outer peripheral part 16b. In the present embodiment, the first connecting portion 16c is formed by a tapered surface that is linearly inclined.

The first spool housing portion 14a comprises an inner peripheral part 18. The inner peripheral part 18 comprises a first inner peripheral part 18a, a second inner peripheral part 18b, a second connecting portion 18c, a line drop prevention portion 18d, and a third connecting portion 18e.

The first inner peripheral part 18a is disposed radially outward of the first outer peripheral part 16a at a first prescribed distance L1 away from the first outer peripheral part 16a. The second inner peripheral part 18b is smaller in diameter than the first inner peripheral part 18a and is disposed radially outward of the second outer peripheral part 16b at a second prescribed distance L2 away from the second outer peripheral part 16b. The second connecting portion 18c couples the first inner peripheral part 18a and the second inner peripheral part 18b. In the present embodiment, the second connecting portion 18c couples the first inner peripheral part 18a and the second inner peripheral part 18b on a surface that is substantially perpendicular to the spool shaft 12. The line drop prevention portion 18d is disposed protruding in a tubular shape on the inner peripheral side of the second inner peripheral part 18b so that the second outer peripheral part 16b is disposed in between them. The line drop prevention portion 18d is disposed so that, even if fishing line drops radially inward of the second outer peripheral part 16b, the fishing line will not drop further radially inward. The third connecting portion 18e is disposed so as to couple the second inner peripheral part 18b and the line drop prevention portion 18d. In the present embodiment, the third connecting portion 18e couples the second inner peripheral part 18b and the line drop prevention portion 18d on a surface that is substantially perpendicular to the spool shaft 12. Additionally, the first prescribed distance L1 and the second prescribed distance L2 are the same and are, for example, within the range of 0.5 mm to 2 mm.

Figure 4:
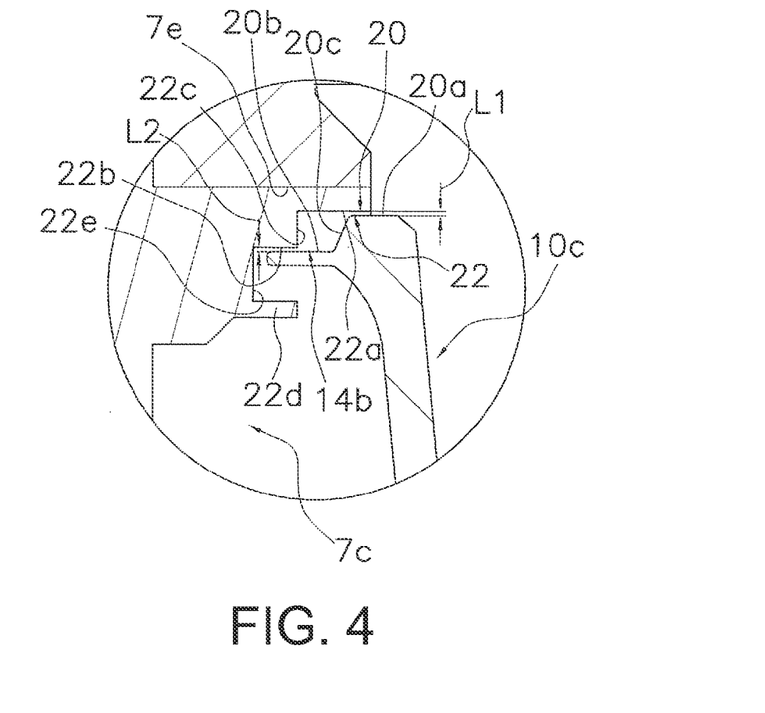
FIG. 4 is an enlarged view of the IV portion in FIG. 2.

On the outer peripheral part 20, the second flange 10c comprises a first outer peripheral part 20a with the same shape as the first flange 10b, a second outer peripheral part 20b, and a first connecting portion 20c, as shown in FIG. 4. The first outer peripheral part 20a is disposed at a first prescribed distance L1 away from an inner peripheral part 22 of a second spool housing portion 14b mentioned below. The second outer peripheral part 20b is disposed at a second prescribed distance L2 away from an inner peripheral part 22 of the second spool housing portion 14b and is smaller in diameter than the first outer peripheral part 20a. The diameter of the first connecting portion 20c gradually increases from the second outer peripheral part 20b toward the first outer peripheral part 20a and couples the first outer peripheral part 20a and the second outer peripheral part 20b. In the present embodiment, the first connecting portion 20c is configured by a tapered surface that is linearly inclined.

The second spool housing portion 14b comprises an inner peripheral part 22. The inner peripheral part 22 comprises a first inner peripheral part 22a that has the same shape as the first spool housing portion 14a, a second inner peripheral part 22b, a second connecting portion 22c, a line drop prevention portion 22d, and a third connecting portion 22e. The first inner peripheral part 22a is disposed radially outward of the first outer peripheral part 20a at a first prescribed distance L1 away from the first outer peripheral part 20a. The second inner peripheral part 22b is smaller in diameter than the first inner peripheral part 22a and is disposed radially outward of the second outer peripheral part 20b at a second prescribed distance L2 away from the second outer peripheral part 20b. The second connecting portion 22c couples the first inner peripheral part 22a and the second inner peripheral part 22b. In the present embodiment, the second connecting portion 22c couples the first inner peripheral part 22a and the second inner peripheral part 22b on a surface that is substantially perpendicular to the spool shaft 12. The line drop prevention portion 22d is disposed protruding in a tubular shape on the inner peripheral side of the second inner peripheral part 22b so that the second outer peripheral part 20b is disposed in between them. The line drop prevention portion 22d is disposed so that, even if fishing line drops radially inward of the second outer peripheral part 20b, the fishing line will not drop further radially inward. The third connecting portion 22e is disposed so as to couple the second inner peripheral part 22b and the line drop prevention portion 22d. In the present embodiment, a third connecting portion 22e couples the second inner peripheral part 22b and the line drop prevention portion 22d on a surface that is substantially perpendicular to the spool shaft 12. Additionally, the first prescribed distance L1 and the second prescribed distance L2 are the same and are, for example, within the range of 0.5 mm to 2 mm.

Next, the action of the dual-bearing reel 100 will be explained.

When casting the fishing line by casting or with the weight of the tackle, there are cases in which the fishing line becomes slack on the spool 10 and the fishing line enters the second outer peripheral part 16b (or the second outer peripheral part 20b) from the gap between the first outer peripheral part 16a (or the first outer peripheral part 20a) and the first spool housing portion 14a (or the second spool housing portion 14b).

Accordingly, in the present embodiment, the first outer peripheral part 16a (or the first outer peripheral part 20a) and the second outer peripheral part 16b (or the second outer peripheral part 20b) are coupled by a first connecting portion 16c (or a first connecting portion 20c) formed by a tapered surface with a diameter that gradually increases from the second outer peripheral part 16b (or the second outer peripheral part 20b) to the first outer peripheral part 16a (or the first outer peripheral part 20a). Therefore, when the fishing line is pulled, a force acts to return the fishing line onto the bobbin trunk 10a, and the fishing line can more easily return to the bobbin trunk 10a along the first connecting portion 16c (or the first connecting portion 20c). Thus, removing the fishing line from the inside of the reel body 1 is easy even when the fishing line enters the inside of the reel body 1.

Modified Example 1

Figure 5:
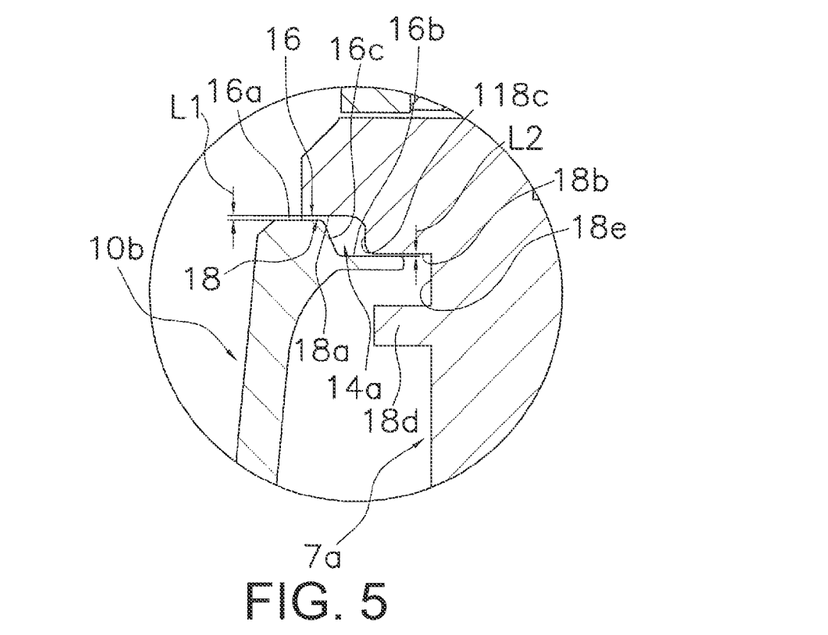
FIG. 5 is a view of modified example 1 corresponding to FIG. 3.

In a modified example 1 shown in FIG. 5, the shape of the second connecting portion 118c and the second prescribed distance L2 are different from the above-described embodiment. The second connecting portion 118c is continuously curved so as to couple the first inner peripheral part 18a and the second inner peripheral part 18b. In this embodiment, the fishing line is less likely to be damaged even if the fishing line comes in contact with the second connecting portion 118c. Additionally, the second prescribed distance L2 is smaller than the first prescribed distance L1. Besides these points, the configuration of the reel body of modified example 1 is the same as that in the above-described embodiment.

In such a modified example 1, the second connecting portion 118c is continuously curved to couple the first inner peripheral part 18a and the second inner peripheral part 18b, so that the fishing line is less likely to be damaged even if the fishing line comes in contact with the second connecting portion 118c. Additionally, the second prescribed distance L2 is smaller than the first prescribed distance L1, so that the fishing line is less likely to drop from the second outer peripheral part 16b even if the fishing line enters the second outer peripheral part 16b. Moreover, the second prescribed distance L2 is, for example, within a range of 0.3 mm to 1.8 mm.

Modified Example 2

Figure 6:
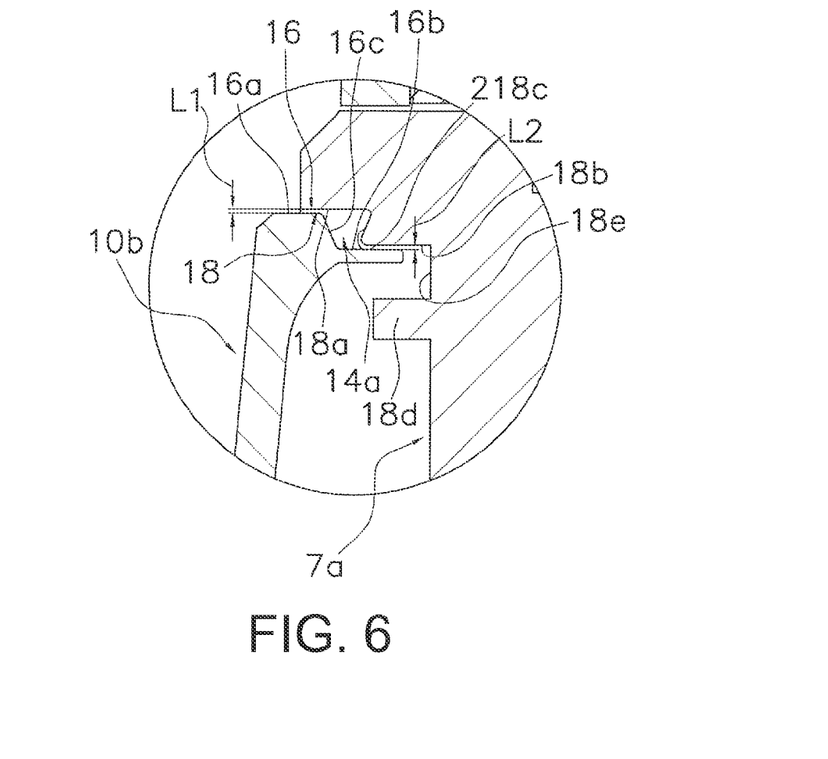
FIG. 6 is a view of modified example 2 corresponding to FIG. 3.

In a modified example 2 shown in FIG. 6, the configuration of the second connecting portion 218c differs from that in the above-described embodiment. In modified example 2, the axial position where the second connecting portion 218c is coupled with the second inner peripheral part 18b is disposed further on the first connecting portion 16c side than the position for coupling with the first inner peripheral part 18a. Besides this point, the configuration of the reel body of modified example 2 is the same as that in the above-described embodiment. Accordingly, fishing line that enters the second outer peripheral part 16b side is guided to the first connecting portion 16c side When coming in contact with the second connecting portion 218c. Therefore, the fishing line is less likely to drop.

Modified Example 3

Figure 7:
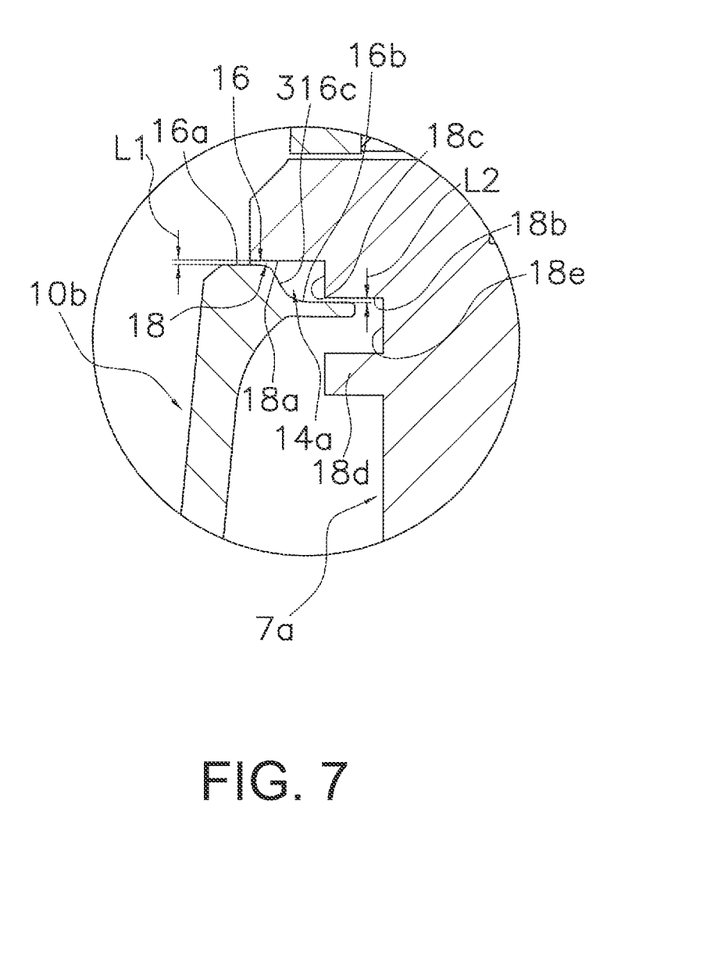
FIG. 7 is a view of modified example 3 corresponding to FIG. 3.

In a modified example 3 shown in FIG. 7, the configuration of the first connecting portion 316c of the spool differs from that in the above-described embodiment. In modified example 3, the first connecting portion 316c is formed to be continuously curved in order to couple the first outer peripheral part 16a and the second outer peripheral part 16b. Besides this point, the configuration of the spool of modified example 3 is the same as that in the above-described embodiment. In this embodiment, since the first connecting portion 316c is smoothly formed, the fishing line is less likely to be damaged even if the fishing line comes in contact with the first connecting portion 316c when removing the fishing line.

Characteristics

The embodiment described above can be expressed as the following.

(A) A dual-bearing reel 100 is able to cast a fishing line in a forward direction. The dual-bearing reel 100 comprises a reel body 1 and a spool 10. The reel body 1 comprises a first spool housing portion 14a having an inward opening. The spool 10 comprises a bobbin trunk 10a configured to wind fishing line, a first flange 10b that is formed on one end of the bobbin trunk 10a and that has a larger diameter than the bobbin trunk 10a, and a second flange 10c that is formed on the other end of the bobbin trunk 10a and that has a larger diameter than the bobbin trunk 10a.

An outer peripheral part 16 (or an outer peripheral part 20) of either the first flange 10b or the second flange 10c comprises a first outer peripheral part 16a (or a first outer peripheral part 20a), a second outer peripheral part 16b (or a second outer peripheral part 20b), and a first connecting portion 16c (or a first connecting portion 20c). The first outer peripheral part 16a (or the first outer peripheral part 20a) is disposed at a first prescribed distance L1 away from an inner peripheral part 18 (or an inner peripheral part 22) of a first spool housing portion 14a (or a second spool housing portion 14b). The second outer peripheral part 16b (or the second outer peripheral part 20b) is disposed at a second prescribed distance L2 away from an inner peripheral part 118 (or an inner peripheral part 22) of a first spool housing portion 14a (or a second spool housing portion 14b) and is smaller in diameter than the first outer peripheral part 16a (or the first outer peripheral part 20a). The diameter of the first connecting portion 16c (or the first connecting portion 20c) gradually increases from the second outer peripheral part 16b (or the second outer peripheral part 20b) toward the first outer peripheral part 16a (or the first outer peripheral part 20a) and couples the first outer peripheral part 16a (or the first outer peripheral part 20a) and the second outer peripheral part 16b (or the second outer peripheral part 20b).

In this dual-bearing reel 100, the diameter of the first connecting portion 16c (or the first connecting portion 20c) gradually increases from the second outer peripheral part 16b (or the second outer peripheral part 20b) toward the first outer peripheral part 16a (or the first outer peripheral part 20a). In this embodiment, even if fishing line enters the second outer peripheral part 16b (or the second outer peripheral part 20b) from the gap between the first outer peripheral part 16a (or the first outer peripheral part 20a) and the first spool housing portion 14a (or the second spool housing portion 14b), if the fishing line is pulled, a force acts to return the fishing line to the bobbin trunk 10a, and the fishing line can more easily return to the bobbin trunk 10a along the first connecting portion 16c (or the first connecting portion 20c). For this reason, removing the fishing line from the inside of the reel body 1 is easy even when the fishing line enters the inside of the reel body 1.

(B) An inner peripheral part 18 (or an inner peripheral part 22) of the first spool housing portion 14a (or the second spool housing portion 14b) can comprise a first inner peripheral part 18a (or a first inner peripheral part 22a) that is disposed at a first prescribed distance L1 away from the first outer peripheral part 16a (or the first outer peripheral part 20a) and a second inner peripheral part 18b (or a second inner peripheral part 22b) that is disposed at a second prescribed distance L2 away from the second outer peripheral part 16b (or the second outer peripheral part 20b) and that is smaller in diameter than the first inner peripheral part 18a (or the first inner peripheral part 22a). In this embodiment, since a second inner peripheral part 18b (or a second inner peripheral part 22b) that is smaller in diameter than the first inner peripheral part 18a (or the first inner peripheral part 22a) of the first spool housing portion 14a (or the second spool housing portion 14b) is disposed at a second prescribed distance L2 away from the second outer peripheral part 16b (or the second outer peripheral part 20b), the fishing line is less likely to enter the inside of the reel body 1 from the gap between the second outer peripheral part 16b (or the second outer peripheral part 20b) and the second inner peripheral part 18b (or the second inner peripheral part 22b).

(C) The first spool housing portion 14a (or the second spool housing portion 14b) may comprise a second connecting portion 18c (or a second connecting portion 22c) that couples the first inner peripheral part 18a (or the first inner peripheral part 22a) and the second inner peripheral part 18b (or the second inner peripheral part 22b). In this embodiment, since the first inner peripheral part 18a (or the first inner peripheral part 22a) and the second inner peripheral part 18b (or the second inner peripheral part 22b) are coupled, even if fishing line enters the second outer peripheral part 16b (or the second outer peripheral part 20b), this fishing line comes in contact with the second connecting portion 18c (or the second connecting portion 22c) and is less likely to enter the inside of the reel body 1.

(D) The second connecting portion 18c (or the second connecting portion 22c) may be continuously curved to couple the first inner peripheral part 18a (or the first inner peripheral part 22a) and the second inner peripheral part 18b (or the second inner peripheral part 22b). In this embodiment, making the shape facilitate the return of the fishing line to the second outer peripheral part 16b (or the second outer peripheral part 20b) is possible even if the fishing line comes in contact with the second connecting portion 18c (or the second connecting portion 22c). Additionally, since the second connecting portion 18c (or the second connecting portion 22c) is smoothly formed, the fishing line is less likely to be damaged even if the fishing line comes in contact with the second connecting portion 18c (or the second connecting portion 22c).

(E) The first prescribed distance L1 and the second prescribed distance L2 can be the same distance. In this embodiment, the first outer peripheral part 16a (or the first outer peripheral part 20a) and the second outer peripheral part 16b (or the second outer peripheral part 20b) are less likely to come in contact with the first spool housing portion 14a (or the second spool housing portion 14b).

(F) Additionally, the second prescribed distance L2 is smaller than the first prescribed distance L1. In this case, the fishing line is less likely to enter the inside of the reel body 1 from the second outer peripheral part 16b (or the second outer peripheral part 20b).

(G) The first connecting portion 16c (or the first connecting portion 20c) is continuously curved to couple the first outer peripheral part 16a (or the first outer peripheral part 20a) and the second outer peripheral part 16b (or the second outer peripheral part 20b). In this embodiment, since the first connecting portion 16c (or the first connecting portion 20c) is smoothly formed, the fishing line is less likely to be damaged even if the fishing line comes in contact with the first connecting portion 16c (or the first connecting portion 20c).

(H) The first flange 10b can be disposed on the side of a handle 2 for rotating the spool 10 and can comprise an outer peripheral part 16. In this embodiment, removing the fishing line is easy even when the fishing line enters the inside of the reel body 1 from the handle 2 side.

The second flange 10c can comprise an outer peripheral part 20, In this embodiment, removing the fishing line is easy even if the fishing line enters the inside of the reel body 1 from the second flange 10c.

The first prescribed distance L1 and the second prescribed distance L2 may be within the range of 0.5 min to 2 mm. In this embodiment, thin fishing line is less likely to enter from the first outer peripheral part 16a for the first outer peripheral part 20a) and the second outer peripheral part 16b (or the second outer peripheral part 20b), and the first outer peripheral part 16a (or the first outer peripheral part 20a) and the second outer peripheral part 16b (or the second outer peripheral part 20b) are less likely to come in contact with the first spool housing portion 14a (or the second spool housing portion 14b).

OTHER EMBODIMENTS

One embodiment of the present invention was described above, but the present invention is not limited to the above-described embodiment; various modifications can be made without departing from the scope of the invention. In particular, the various embodiments and modified examples described in the present Specification can be freely combined according to necessity.

(a) A second inner peripheral part is disposed in the above-described embodiment and three modified examples, but a second inner peripheral part does not have to be provided.

(b) In the above-described embodiment, an electric reel is given as an example of a dual-bearing reel, but the present invention is not limited thereto. For example, the present invention may be applied to all dual-bearing reels, such as a hand-wound dual-bearing reel or a hand-wound dual-bearing reel with a counter (a water depth display device).

(c) In the above-described embodiment, a first outer peripheral part 16a (or a first outer peripheral part 20a) and a second outer peripheral part 16b (or a second outer peripheral part 20b) are provided to the first flange 10b (or the second flange 10c) of the spool, but the present invention is not limited thereto. The first outer peripheral part and the second outer peripheral part need only to be provided to either the first flange or the second flange. Additionally, the spool housing portion that comprises a first inner peripheral part and a second inner peripheral part needs only to be provided so that either the first flange or the second flange can be housed therein.

(d) in the above-described embodiment, a motor is not disposed in the spool; however, the present invention may be applied to an electric dual-bearing reel in which a motor is disposed in the spool.

What is claimed is:

1. A dual-bearing reel configured to cast a fishing line in a forward direction, comprising:
    a reel body including a spool housing portion having an inward opening; and
    a spool including a bobbin trunk, a first flange and a second flange, the bobbin trunk having a first end and a second end, and being configured to wind the fishing line, the first flange being disposed on the first end of the bobbin trunk and having a diameter that is larger than a diameter of the bobbin trunk, and the second flange being disposed on the second end of the bobbin trunk and having a diameter that is larger than the diameter of the bobbin trunk,
    an outer peripheral part of at least one of the first flange and the second flange, comprising
        a first outer peripheral part disposed at a first prescribed distance away from an inner peripheral part of the spool housing portion,
        a second outer peripheral part disposed at a second prescribed distance away from the inner peripheral part of the spool housing portion and has a diameter that is smaller than a diameter of the first outer peripheral part, and
        a first connecting portion including an outwardly facing tapered surface that is linearly inclined, having a diameter that gradually increases from the second outer peripheral part toward the first outer peripheral part and, and connecting the first outer peripheral part and the second outer peripheral part.

2. A dual-bearing reel configured to cast a fishing line in a forward direction, comprising:
    a reel body including a spool housing portion having an inward opening; and
    a spool including a bobbin trunk, a first flange and a second flange, the bobbin trunk having a first end and a second end, and being configured to wind the fishing line, the first flange being disposed on the first end of the bobbin trunk and having a diameter that is larger than a diameter of the bobbin trunk, and the second flange being disposed on the second end of the bobbin trunk and having a diameter that is larger than the diameter of the bobbin trunk,
    an outer peripheral part of at least one of the first flange and the second flange, comprising
        a first outer peripheral part disposed at a first prescribed distance away from an inner peripheral part of the spool housing portion,
        a second outer peripheral part disposed at a second prescribed distance away from the inner peripheral part of the spool housing portion and has a diameter that is smaller than a diameter of the first outer peripheral part, and
        a first connecting portion with a diameter that gradually increases from the second outer peripheral part toward the first outer peripheral part and, that connects the first outer peripheral part and the second outer peripheral part, the inner peripheral part of the spool housing portion comprising
  a first inner peripheral part being disposed at the first prescribed distance from the first outer peripheral part; and
  a second inner peripheral part being disposed at the second prescribed distance away from the second outer peripheral part and having a diameter that is smaller than a diameter of the first inner peripheral part.

3. The dual-bearing reel recited in claim 2, wherein the spool housing portion further comprises a second connecting portion connecting the first inner peripheral part and the second inner peripheral part.

4. The dual-bearing reel recited in claim 3, wherein the second connecting portion is continuously curved so as to connect the first inner peripheral part and the second inner peripheral part.

5. The dual-bearing reel recited in claim 2, wherein the first prescribed distance and the second prescribed distance are the same distance.

6. The dual-bearing reel recited in claim 2, wherein the second prescribed distance is less than the first prescribed distance.

7. The dual-bearing reel recited in claim 1, wherein the first connecting portion is continuously curved and couples the first outer peripheral part and the second outer peripheral part.

8. The dual-bearing reel recited in claim 1, wherein the first flange is disposed on a handle side of the spool and includes the outer peripheral part.

9. The dual-bearing reel recited in claim 8, wherein the second flange includes the outer peripheral part.

10. The dual-bearing reel recited in claim 1, wherein the first prescribed distance and the second prescribed distance are within a range of 0.5 mm to 2 mm.

* * * * *